Oct. 11, 1938.  F. NALLINGER  2,132,963
CHASSIS OF MOTOR-DRIVEN VEHICLES
Filed Feb. 20, 1936  2 Sheets-Sheet 1

Inventor

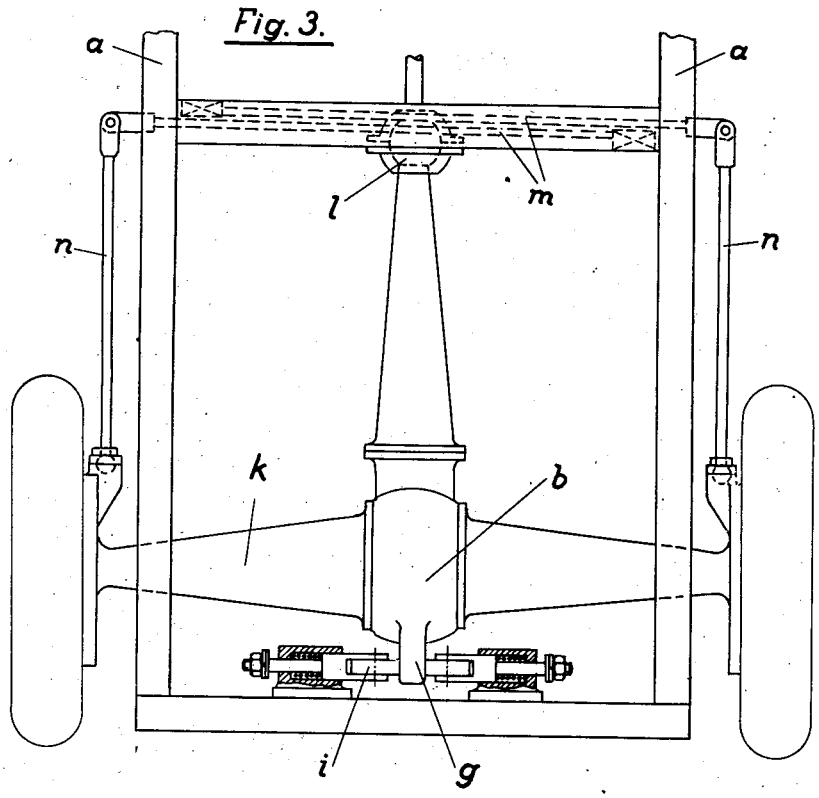
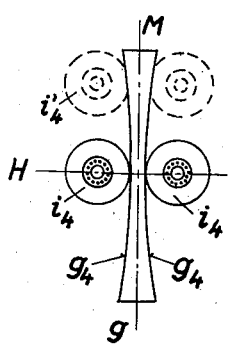
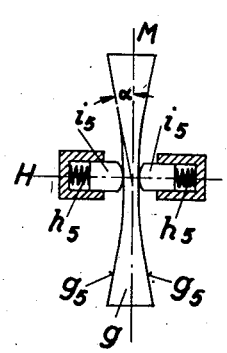
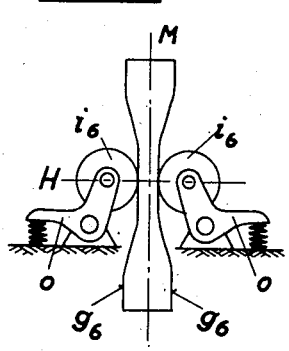

Patented Oct. 11, 1938

2,132,963

UNITED STATES PATENT OFFICE 2,132,963

CHASSIS OF MOTOR-DRIVEN VEHICLES

Fritz Nallinger, Stuttgart, Germany, assignor to Daimler-Benz Aktiengesellschaft, Stuttgart-Unterturkheim, Germany Application February 20, 1936, Serial No. 64,818
In Germany February 18, 1935

13 Claims. (Cl. 280—112)

My invention relates to an improvement of the chassis of motor-driven vehicles and, more particularly, to a chassis of the type in which a rigid axle is suspended by means of frictionless springs incapable of taking up lateral forces. The invention resides essentially in such a guidance of the axle in vertical direction by suitable means that increasing departure of the axle from its normal middle position is opposed by an increasing resistance. Among other advantages the invention has the beneficial effect that the axle will be more quickly returned to its normal position upon a deflection of the springs, and that a comparatively larger resistance is offered to violent shocks than to smaller shocks. This will improve the riding qualities of the vehicle without affecting the softness of the spring function on a road of normal unevenness.

My invention is of particular importance for vehicles in which frictionless springs, such as helical springs or torsional rods, are employed, as it permits the utilization of the advantages of such springs to their full extent and avoids the liability of objectionable oscillations being produced upon larger shocks. At the same time, lateral forces acting between the axle and the frame are better taken up and the lateral stability of the vehicle is improved. The manner in which the resistance increases may be adapted to the conditions existing in any particular case. The increase may be a continuous one or it may be non-continuous. It is particularly advantageous in some instances if the increase in resistance offered to the axle is not proportional but unproportional to the amount of departure of said axle from its midposition, such increase being equally effective upon either upward or downward motion of the axle.

Further objects and advantages of this invention will be apparent from consideration of the specification as illustrated by the accompanying drawings of possible embodiments of the invention, in which drawings:

Fig. 3 illustrates a modification of the invention,

Figs. 4–6 illustrate three different embodiments of the guiding and supporting means.

Figure 1:
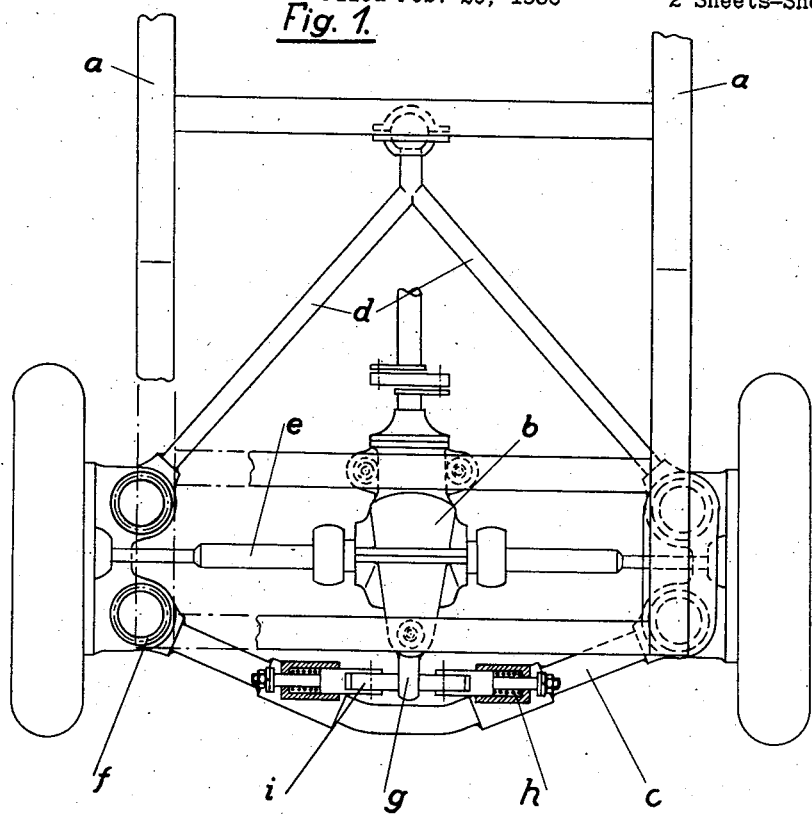
Fig. 1 is a plan view of a rear axle suspension according to the invention.
Figure 2:
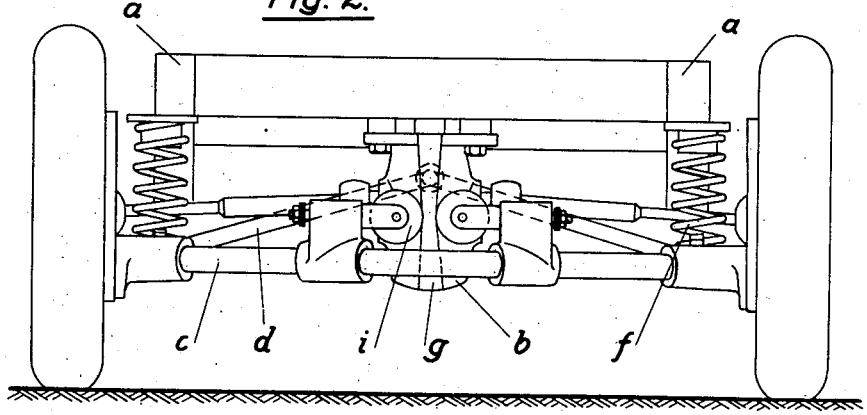
Fig. 2 is a rear view of Fig. 1.

In Figs. 1 and 2, $a$ is a frame, $b$ an axle gear rigidly or resiliently attached thereto and $c$ is a rigid axle connecting the wheel and held in position relative to the frame by suitable means such as triangular struts $d$. The axle $c$ and the struts $d$ constitute an axle frame pivoted to the frame of the vehicle. The wheels are driven by universal joint shaft $e$ and the springs of the vehicle are preferably frictionless helical springs such as springs $f$. For laterally supporting the axle relative to the frame, a guiding bar $g$ is attached to the frame in a substantially vertical position. Two rollers $i$ adapted to roll on the guide bar $g$ when the axle springs are deflected, are mounted on the axle. Springs $h$ may be interposed between the axle and the rollers.

In the embodiment of Fig. 3, the axle and the axle gear are combined to constitute a rear axle structure $k$ which is supported relative to the frame by means illustrated as a ball-joint $l$. The axle structure carries a guiding bar $g$ whereas the rollers $i$ are mounted on the frame. The springs of the chassis are torsional rods $m$ attached to the frame by any suitable means and adapted to be operated by means of links $n$ pivotally connected to the axle, and to the torsional rods respectively.

Various embodiments of the guiding means are illustrated in Figs. 4, 5 and 6.

In Fig. 4, the guiding bar $g$ is provided with two curved guiding faces $g^4$ of continuous curvature. The line of smallest distance of the guiding faces is in the central plane H—H and the guiding faces diverge in upward and in downward direction in such a manner that the increase of the distance of both faces relative to the same portions of the stroke, that is to say, the angle $\alpha$ formed by the tangents of the curve with the vertical line M—M becomes gradually larger. If desired, the curvature of the guiding face may continuously or partially increase from the center.

The rollers $i^4$ may consist of rubber, or any similar resilient material, and are mounted on studs by means of needle-roller bearings. Upon a deflection of the springs, they will arrive in such a position as $i^4$ in which they are deformed because of the greater width of the guiding bar and are pressed against the guiding bar with an increased pressure. Instead of using rollers of rubber, I may mount the rollers resiliently, for instance in the manner indicated in Fig. 1, or I may use resiliently mounted rubber rollers.

The guiding and supporting means illustrated in Fig. 5 differ from the afore-described arrangement substantially by the shape of the guiding bar, the faces $g^5$ of the guiding bar forming a substantially constant angle $\alpha$ with a vertical line, whereby the amplification of the effective resistance will increase substantially in proportion to the deflection of the springs. This construction is comparatively simple and inexpensive. The guiding members may be formed by sliding pieces i5 springed by springs h5, for instance.

Fig. 6 illustrates an embodiment in which the guiding resistance is increased in a substantially stepwise manner, the guiding faces g6 being so curved as to converge towards the vertical plane again at a certain distance from the horizontal middle plane H—H. Therefore, the guiding resistance remains substantially constant or increases but little up to the desired point. The rollers i6 may be carried by resiliently mounted levers shown as o.

The guiding bars may be connected with the frame or with the axle, whereas the rollers or guiding members are mounted on the other one of these two elements. Similarly, the axle gear may be attached to the frame in all of these cases (that is to say, also in the embodiment of Fig. 3 for instance) or may be arranged in the axle casing corresponding to Fig. 3 (for instance also in Figs. 1 and 2). The guiding faces and the guiding members may be constructed and combined with each other in any desired manner. The curves may be designed for an upward movement of the axle in a different manner than for a downward movement of the same. Instead of frictionless springs, any desired other springs, for instance leaf-springs, may be used. The invention is applicable to front and rear axles, particularly however to the latter, while the front wheels are preferably guided parallel to themselves.

In addition, the terms "frame" or "chassis" as herein used, are not to be understood as limited to such devices when formed separate from the body or coach work of the vehicle but as including such devices when formed as a part of or integrally interconnected with the body or coach work of the vehicle.

It will be seen that I have provided a construction which satisfies the objects enumerated above and one which constitutes a valuable advance in the art. While I have shown the invention in certain physical embodiments it is to be understood that modifications of the structure shown may be made by those skilled in this art without departing from my invention as expressed in the claims which follow.

What I claim is:

1. In a vehicle having a frame, an axle, wheels mounted on said axle, torsional spring means attached at one end to said frame, linkage means pivoted at one end of said torsional spring means for movement in a direction substantially transverse of said frame, means for pivoting the other end of said linkage means to said axle for movement in a direction substantially transverse to said frame, and additional means for resisting transverse movement of said axle.

2. The combination according to claim 1 wherein said torsional spring means are positioned transverse of said frame.

3. The combination according to claim 1 in which said additional means comprises spring means.

4. In a vehicle, in combination, a main vehicle frame, a subsidiary axle frame comprising an axle, wheels mounted on said axle, means for pivoting said axle frame to said main frame for transverse and vertical motion relative thereto, relatively soft spring means intermediate said main frame and said axle frame for absorbing relatively light vertical shocks upon said wheels while permitting relative transverse movement thereof, and second spring means intermediate said frame and said axle frame for absorbing relatively heavy vertical shocks upon said wheels, said second spring means being so constructed and arranged as to guide the central part of said axle frame for movement in a substantially vertical plane and for resiliently resisting transverse movement of the axle relative to the vehicle frame.

5. The combination according to claim 4 in which said second spring means are so constructed as to offer rapidly increasing resistance to vertical motion of said axle frame beyond a certain small normal motion.

6. The combination according to claim 4 in which said first spring means comprise torsion bars.

7. The combination according to claim 4 in which said first spring means comprise helical springs.

8. In a vehicle, in combination, a frame, an axle, road wheels mounted on said axle, connecting means between said axle and frame, and relatively soft spring means intermediate said frame and axle for absorbing relatively light vertical shocks, said connecting means and spring means being so constructed as to permit relative transverse movement of said axle and frame, and an auxiliary spring means intermediate said frame and said axle for absorbing relatively heavy vertical shocks upon said wheels, said auxiliary spring means being so constructed and arranged as to guide the central part of said axle for movement in a substantially vertical plane and for resiliently resisting transverse movement of the axle relative to the vehicle frame.

9. The combination according to claim 8 in which said second spring means are so constructed as to offer rapidly increasing resistance to vertical motion of said axle frame beyond a certain small normal motion.

10. The combination according to claim 8 in which said first spring means comprise torsion bars.

11. The combination according to claim 8 in which said first spring means comprise helical springs.

12. The combination according to claim 8 in which the connecting means and auxiliary spring means are so constructed and arranged that the axle is free to rock about an axis near the central longitudinal plane of the vehicle.

13. The combination according to claim 8 in which the auxiliary spring means is so constructed and arranged that its reaction increases unproportionally to the distance the axle is moved from its normal position.

FRITZ NALLINGER.